(12) United States Patent
Veeraraghavan et al.

(10) Patent No.: US 9,922,105 B2
(45) Date of Patent: Mar. 20, 2018

(54) METHOD AND APPARATUS OF MAINTAINING DATA FOR ONLINE ANALYTICAL PROCESSING IN A DATABASE SYSTEM

(71) Applicant: HUAWEI TECHNOLOGIES CO., LTD., Shenzhen, Guangdong (CN)

(72) Inventors: Vinoth Veeraraghavan, Shenzhen (CN); Prasanna Venkatesh Ramamurthi, Bangalore (IN); Zhibiao Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/201,044

(22) Filed: Jul. 1, 2016

(65) Prior Publication Data

US 2016/0314177 A1    Oct. 27, 2016

Related U.S. Application Data

(63) Continuation of application No. PCT/CN2014/070031, filed on Jan. 2, 2014.

(51) Int. Cl.
*G06F 7/00* (2006.01)
*G06F 17/30* (2006.01)
*H04L 29/08* (2006.01)

(52) U.S. Cl.
CPC .... *G06F 17/30563* (2013.01); *G06F 17/3089* (2013.01); *G06F 17/30174* (2013.01);
(Continued)

(58) Field of Classification Search
CPC .................................................. G06F 17/3089
See application file for complete search history.

(56) References Cited

U.S. PATENT DOCUMENTS 4,812,981 A    3/1989  Chan et al.
7,395,278 B2   7/2008  Zwilling et al.
(Continued)

FOREIGN PATENT DOCUMENTS

CN      102591910 A    7/2012
EP      1610235 A1    12/2005
(Continued)

OTHER PUBLICATIONS

XP31868461A,Alfons Kemper et al:"Hyper: a hybrid oltpandolap main memory database system based on virtual memory snapshots",DATA engineering, 2011 IEEE 27th international conference on, IEEE. Apr. 11, 2011. total 12 pages.
(Continued)

*Primary Examiner* — Ajith Jacob
(74) *Attorney, Agent, or Firm* — Huawei Technologies Co., Ltd.

(57) ABSTRACT

A method and an apparatus of maintaining data for online analytical processing in a database system. The method includes: tracking a changed page in a main process; and synchronizing the changed page to a child process for online analytical processing. In the method and apparatus of maintaining data for online analytical processing, the changed pages are tracked and then the child process is synchronized with the changed pages. Therefore, periodic forking is avoided, fork overhead due to periodic forking in the prior art is removed, the synchronization is faster since only the changed pages are synchronized, and the performance of online data processing is enhanced.

25 Claims, 7 Drawing Sheets

(52) U.S. Cl.
CPC .. *G06F 17/30575* (2013.01); *G06F 17/30587* (2013.01); *G06F 17/30592* (2013.01); *H04L 67/02* (2013.01)

(56) References Cited

U.S. PATENT DOCUMENTS

| | | | |
|---|---|---|---|
| 8,195,722 | B1 | 6/2012 | Havemose et al. |
| 2004/0221125 | A1 | 11/2004 | Ananthanarayanan et al. |
| 2007/0180312 | A1 | 8/2007 | Rhodes et al. |
| 2010/0228913 | A1* | 9/2010 | Czezatke ............ G06F 11/1451 711/112 |
| 2011/0307674 | A1 | 12/2011 | Ryu et al. |
| 2012/0036334 | A1 | 2/2012 | Horman et al. |
| 2013/0073513 | A1* | 3/2013 | Kemper ............ G06F 17/30587 707/600 |
| 2013/0073521 | A1 | 3/2013 | Ng et al. |

FOREIGN PATENT DOCUMENTS

| | | |
|---|---|---|
| JP | H0444140 A | 2/1992 |
| JP | H09305631 A | 11/1997 |
| JP | 2007207250 A | 8/2007 |
| JP | 2013531835 A | 8/2013 |
| KR | 20110136639 A | 12/2011 |
| WO | 2011144382 A1 | 11/2011 |

OTHER PUBLICATIONS

XP55220690A,Greg Nakhimovsky:"Minimizing memory usage for creating application subprocesses", May 31, 2006. total 4 pages.

XP58003392A,Henrik Muhe et al:"How to efficiently snapshot transactional data", data management on new hardware, acm, penn plaza,suize 701 new york ny 10121-0701 USA. Jun. 13, 2011. total 10 pages.

Jonas S Karlsson et al. An Implementation of Transaction Logging and Recovery in a Main Memory Resident Database System. CAElab, IDA, Linköping University. Oct. 1995. total 47 pages.

Jaewoong Chung et al. Fast Memory Snapshot for Concurrent Programmingwithout Synchronization, Jun. 8-12, 2009. total 9 pages.

How Database Snapshots Work, MSDN library: from http://msdn.microsoft.com/en-us/library/ms187054(v=sql.105).aspx, 2016 microsoft. total 5 pages.

Alfons Kemper et al. HyPer: A Hybrid OLTPandOLAP Main Memory Database System Based on Virtual Memory Snapshots. ICDE Conference 2011. total 12 pages.

Florian Funke et al. HyPersonicCombined Transaction and Query Processing, 37th International Conference on Very Large Data Bases, 2011. total 4 pages.

Khuzaima Daudjee et al. Lazy Database Replication with Snapshot Isolation, Copyright 2006 VLDB Endowment. Sep. 2006. total 12 pages.

* cited by examiner

METHOD AND APPARATUS OF MAINTAINING DATA FOR ONLINE ANALYTICAL PROCESSING IN A DATABASE SYSTEM

CROSS-REFERENCE TO RELATED APPLICATIONS

This application is a continuation of International Application No. PCT/CN2014/070031, filed on Jan. 2, 2014, which is hereby incorporated by reference in its entirety.

TECHNICAL FIELD

The present disclosure relates to the field of data processing technologies, and in particular, to a method and an apparatus of maintaining data for online analytical processing.

BACKGROUND

Online transaction processing (OLTP) and online analytical processing (OLAP) are two types of database systems. OLTP system is used to manage and process transactions. Typical examples of such transaction processing systems are sales order entry or banking transaction processing system. OLAP system is used to analyze data to generate reports for business analysts. Typical reports include aggregated sales statistics grouped by geographical regions, or by product categories, or by customer classifications, etc.

Initial attempts to execute OLAP queries on the operational OLTP database were dismissed as the OLAP query processing led to resource contentions and severely hurt the mission-critical transaction processing. Therefore, the data staging architecture was devised where the transaction processing is carried out on a dedicated OLTP database system. In addition, a separate data warehouse system is installed for OLAP query processing. Periodically, e.g., during the night, the OLTP database changes are extracted, transformed to the layout of the data warehouse schema, and loaded into the data warehouse. This data staging and its associated ETL (Extract-Transform-Load) obviously incurs the problem of data staleness as the ETL process can only be executed periodically.

Real-time/operational business intelligence demands to execute OLAP queries on the current, up-to-date state of the transactional OLTP data. As a solution, an existing hybrid system having a main-memory database is proposed to handle both OLTP and OLAP simultaneously by using hardware-assisted replication mechanisms to maintain consistent snapshots of the transactional data. The system executes OLAP query sessions on the same, arbitrarily current and consistent snapshot. These snapshots are created by forking the OLTP process and thereby creating a consistent virtual memory snapshot. The system allows for arbitrarily current snapshots by periodically forking a new snapshot and thus starting a new OLAP query session process.

Even though the existing hybrid system look promising, they too may have technical problems. Forking of a large process typically consumes time in the order of milliseconds. This is because of a large number of page table entries (PTEs) should be replicated. As per one reference 384M of data contains about 100K pages. So the periodic forking will impact the performance of online data processing. In addition, forking does a big bang copy of the PETs and does not optimize the copy to the small delta that could have changed.

SUMMARY

Embodiments of the present disclosure provide a method and an apparatus of maintaining data for online analytical processing in a database system, to avoid periodic forking and enhance the performance of online data processing.

According to a first aspect, a method of maintaining data for online analytical processing in a database system includes:

tracking, by an operating system kernel, a page changed by a main process which runs in the database system and executes online transactions; and synchronizing, by the operating system kernel, the changed page to a child process which runs in the database system and executes online analytical processing.

In a first possible implementation form of the method of maintaining data for online analytical processing in a database system according to the first aspect, tracking the changed page includes: tracking a copy-on-write page and/or a new page.

In a second possible implementation form of the method of maintaining data for online analytical processing in a database system according to the first aspect, the method further includes storing an address range of a memory to be tracked; where tracking the changed page includes: if writing data to a page results in a page fault, determining the page is the changed page, and if a physical page address of the changed page is within the address range, then storing the physical page address in a first data structure.

In a third possible implementation form of the method of maintaining data for online analytical processing in a database system according to the second possible implementation form of the first aspect, synchronizing the changed page to the child processes includes:

obtaining the stored physical page address from the main process;

finding a virtual page address in the child process which points to the stored physical page address;

if the virtual page address exists, updating a page table entry of the virtual page address with the stored physical page address; if the corresponding virtual page address does not exist, a new page table entry mapping a new virtual page address to the stored physical page address is created;

incrementing a shared page count and setting a page flag corresponding to the stored physical page address to be writable.

In a fourth possible implementation form of the method of maintaining data for online analytical processing in a database system according to the first aspect, synchronizing the changed page to the child process includes synchronizing the changed page to the child process at a predetermined sync time point.

In a fifth possible implementation form of the method of maintaining data for online analytical processing in a database system according to the first aspect before tracking the changed page, the method further includes: forking the child process which is a child to the main process.

In a sixth possible implementation form of the method of maintaining data for online analytical processing in a database system according to the fifth possible implementation form of the first aspect, forking the child process includes: forking an intermediate process which is a child to the main process; and forking the child process which is a child to the intermediate process; where synchronizing the changed page to the child process includes synchronizing the changed page to the intermediate process; and synchronizing the child process with the intermediate process.

In a seventh possible implementation form of the method of maintaining data for online analytical processing in a database system according to the first aspect, there are multiple child processes, and the changed page is synchronized to at least one child process of the multiple child processes; and other child processes of the multiple child processes are synchronized with the at least one child process to which the changed page has been synchronized.

In a eighth possible implementation form of the method of maintaining data for online analytical processing in a database system according to the first aspect, when a sync time reaches, online transaction processing is blocked until the child process is synchronized; and the changed page is set to be shared and writable from the child process.

In a ninth possible implementation form of the method of maintaining data for online analytical processing in a database system according to the second possible implementation form of the first aspect, when a sync time reaches, the changed page is set to be writable, the child process is synchronized with the changed page according to the first data structure; a new changed page is tracked and a page address of the new changed page is stored in a second data structure.

According to a second aspect, an apparatus of maintaining data for online analytical processing includes:

a tracking unit, configured to track a page changed by a main process which runs in the database system and executes online transaction processing; and a synchronization unit, configured to synchronize the changed page to a child process which runs in the database system and executes online analytical processing.

In a first possible implementation form of the apparatus of maintaining data for online analytical processing in a database system according to the second aspect, the tracking unit is specifically configured to track a copy-on-write page and/or a new page.

In a second possible implementation form of the apparatus of maintaining data for online analytical processing in a database system according to the second aspect, the apparatus further includes: a first storing unit, configured to store an address range of a memory to be tracked; a second storing unit, configured to store a physical page address of the changed page; where the tracking unit is specifically configured to store, if writing data to a page results in a page fault and a physical page address of the page is within the address range, the physical page address in the second storing unit.

In a third possible implementation form of the apparatus of maintaining data for online analytical processing in a database system according to the second possible implementation form of the second aspect, the synchronization unit is specifically configured to:

obtain the physical page address from the second storing unit;

find in the child process a virtual page address which points to the physical page address;

if the virtual page address exists, update a page table entry of the virtual page address with the physical page address obtained from the second storing unit, otherwise, create a new page table entry mapping a new virtual page address in the child process to the physical page address obtained from the second storing unit;

increment a shared page count and set a page flag corresponding to the obtained physical page address to be writable.

In a fourth possible implementation form of the apparatus of maintaining data for online analytical processing in a database system according to the second aspect, the apparatus further includes a forking unit, configured to fork, when a memory required by the database system is allocated, the child process for the online analytical processing.

In a fifth possible implementation form of the apparatus of maintaining data for online analytical processing in a database system according to the second aspect, the synchronization unit is specifically configured to synchronize the changed page to the child process at a predetermined sync time.

In a sixth possible implementation form of the apparatus of maintaining data for online analytical processing in a database system according to the fourth possible implementation form of the second aspect, the forking unit is specifically configured to fork a intermediate process and the child process, where the intermediate process is a child to the main process and the child process is a child to the intermediate process; the synchronization unit is specifically configured to synchronize the changed page to the intermediate process; and synchronize the child process with the intermediate process.

In a seventh possible implementation form of the apparatus of maintaining data for online analytical processing in a database system according to the second aspect, there are multiple child processes, and the synchronization unit is specifically configured to synchronize the changed page to at least one child process of the multiple child processes; and synchronize other child processes of the multiple child process with the at least one child process to which the changed page has been synchronized.

According to a third aspect, an apparatus of maintaining data for online analytical processing includes:

a memory for storing a database;

a processor; and a storage, couple to the processor, storing instructions that, when executed, cause the processor to perform the above method.

In the method and apparatus of maintaining data for online analytical processing in a database, the pages changed by the main process which runs in the database system and executes online transactions are tracked and then the changed pages are synchronized to the child process which runs in the database system and executes online analytical processing. Compared with the solution of periodically forking child processes to maintain consistent snapshots of the transactional data, the changed pages are tracked and then synchronized to the child process, and thus periodic forking is avoided, fork overhead due to periodic forking in the prior art is removed, the synchronization is faster since only the changed pages are synchronized, and the performance of online data processing is enhanced.

DETAILED DESCRIPTION

The technical solutions in the embodiments of the present invention are elaborated below with reference to the accompanying drawings. Evidently, the embodiments described below are for an exemplary purpose only, without covering all embodiments of the present invention. Those skilled in the art may derive other embodiments from the embodiments given herein without making creative effort, and all such embodiments are covered in the protection scope of the present invention.

The present embodiment uses multiple processes to manage the OLTP workload and the OLAP workload, and uses co-operative process synchronization to realize real-time OLAP database.

Figure 1:
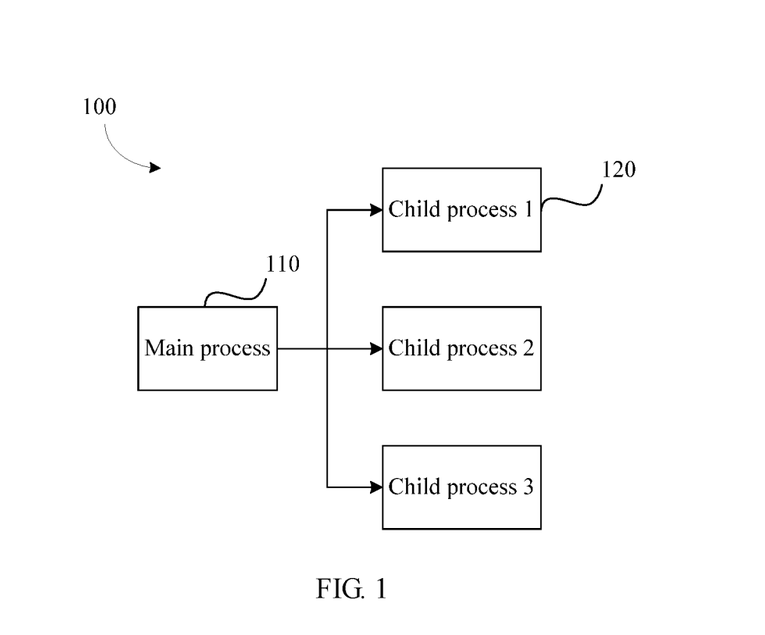
FIG. 1 is a schematic diagram of a database system topology according to an embodiment of the present invention.

As shown in FIG. 1, in a database system 100, there is one multi-threaded process, termed as the main process 110 which is responsible for the OLTP. The main process 110 is the only process in the database system 100 capable of a write. Additionally the database system 100 contains at least one read-only multi-threaded process 120 which is a child to the main process 110 and used for OLAP queries. The present embodiment depends on tracking the delta changes on the main process 110 and synchronizing these changes to the child process 120 without periodic forking.

Figure 2:
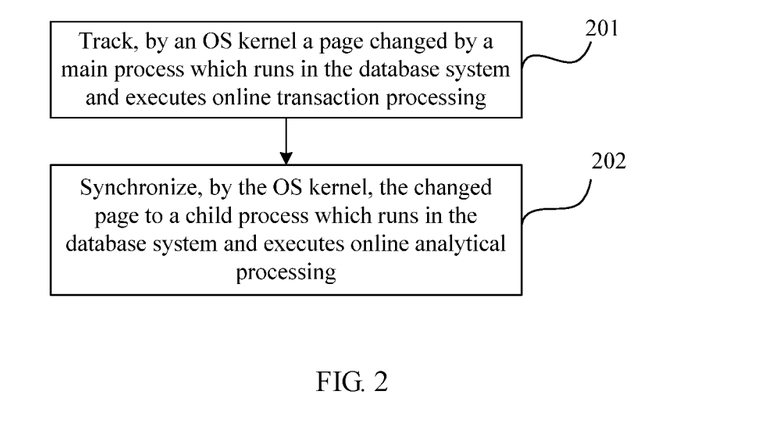
FIG. 2 is a flow chart of a method of maintaining data for online analytical processing in a database system according to an embodiment of the present invention.

FIG. 2 shows a flow chart of a method of maintaining data for online analytical processing in a database system according to an embodiment of the present invention. The embodiment works with the co-operation between a main process and at least one of child process with the aid of an operating system (OS). The co-operation is in terms of memory data sharing and also execution control. The method includes following steps:

Step 201, track, by an OS kernel a page changed by a main process which runs in the database system and executes online transaction processing; and Step 202, synchronize, by the OS kernel, the changed page to a child process which runs in the database system and executes online analytical processing (OLAP).

In the embodiment of the method of maintaining data for online analytical processing in a database system, the changed page is tracked, and then the child process for online analytical processing is synchronized with the changed pages. Compared with the solution of periodically forking child processes to maintain consistent snapshots of the transactional data, this embodiment synchronizes the changed pages to the existing child process, thus periodic forking is avoided, fork overhead due to periodic forking is removed, the synchronization is faster since only the changed pages are synchronized, and the performance of online data processing is enhanced.

Figure 3:
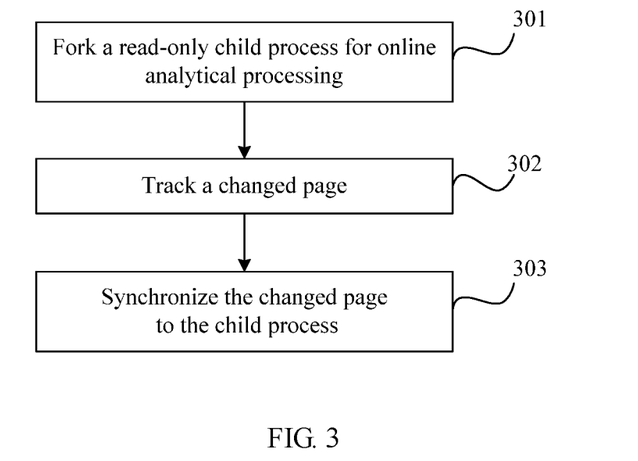
FIG. 3 is a flow chart of a method of maintaining data for online analytical processing in a database system according to an embodiment of the present invention.

FIG. 3 shows a flow chart of a method of maintaining data for online analytical processing in a database system according to an embodiment of the present invention. The method includes the following steps.

Step 301, fork a read-only child process for online analytical processing;

When a memory required by the database system such as table space, control memory, etc. is pre-allocated, the child process for online analytical processing is forked at once. In an embodiment, the main process informs an OS to fork the child process via Linux system call fork( ).

Step 302, track a changed page;

The main process knows an address range of the memory to be tracked and synchronized, and informs the OS about the address range of the memory to be tracked for changes. The OS can store the address range to be tracked in the process address space. This tracking of delta changes is done by an OS kernel.

The OS stores its mappings of virtual addresses to physical addresses in a page table. Each mapping is also known as a page table entry (PTE). Each PTE includes the virtual address and its corresponding physical address.

In an embodiment, all the copy-on-write (CoW) pages and new pages are tracked and then the child process PTEs are synchronized just with the latest physical address of the changed pages.

The tracking should be done for the database data related memory. For a main memory database, all the data pages and transactional pages, all the database metadata information like control pages, and all the global data structures which contain the database information fall in the memory to be tracked.

The tracked memory could be allocated on heap or on a private shared memory. The invention does not distinguish between the two cases.

Step 303, synchronize the changed page to the child process.

In this step, the child process informs the OS to synchronize the changed pages.

In an embodiment, sync time points can be predetermined in the main process, and then the child process is informed by the main process to perform synchronization at every sync time point. Upon receiving a signal to perform synchronization, the child process informs the OS, and the OS kernel synchronizes the changed pages to the child process.

Figure 4:
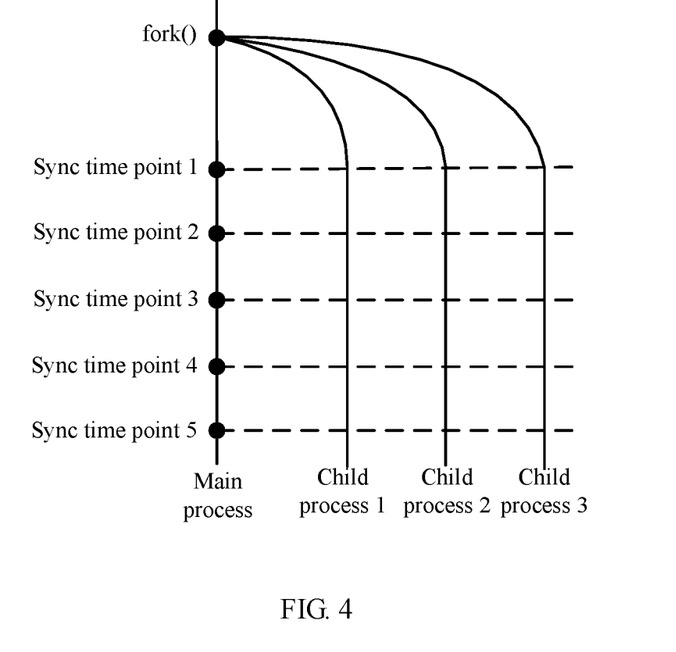
FIG. 4 is a schematic diagram illustrating sync time points according to an embodiment of the present invention.

For example, as shown in FIG. 4, at the beginning, the child process 1, the child process 2 and the child process 3 are forked; then, at each sync time point of the sync time points 1-5, the main process informs the child processes 1, 2 and 3 to synchronize. The sync time points 1-5 can be predetermined in the main process. The main process can also determine when to inform the child processes to synchronize based on the actual OLTP situation. For example, if a sync time point is reached, however, no page is modified since the last sync time point, then the main process will not inform the child processes to synchronize. If a next sync time point is not reached, but the number of the changed pages has exceeded a certain value, then the main process may inform the child process to synchronize before the next sync time point.

In the embodiment of the method of maintaining data for online analytical processing in a database system, the child process for online analytical processing is forked, the changed pages are tracked, and then the child process is synchronized with the changed pages. Compared with the solution of periodically forking child processes to maintain consistent snapshots of the transactional data, this embodiment synchronizes the changed pages to the existing child process, thus periodic forking is avoided, fork overhead due to periodic forking is removed, the synchronization is faster since only the changed pages are synchronized, and the performance of online data processing is enhanced.

In addition, compared to the periodic forking solution in prior art, in embodiments of the present invention, many other data copy and process setup are also reduced. The child process has loaded cache entries and translation lookaside buffer (TLB) entries which remain intact if the relevant page was not changed. So the data remains hot and cache misses are reduced, and thus the child process performance is also better.

In the periodic forking solution in the prior art, at some points of time, there could be many child processes in the system thus consuming memory and CPU. However, in the embodiments of the present invention, the number of child processes is fixed and controlled. So there is no problem of too much system resource consumption.

Moreover, many main memory databases are used in embedded mode i.e. the query execution from the application is done through an application program interface (API) call on the database. In embedded mode, the periodic forking solution in the prior art will lead to loss of the application link. By contrast, in the embodiments of the present invention, the application link in embedded mode are retained, since the child processes are created initially and kept alive instead of periodically killing old child processes and forking new child processes, therefore the loss of the application link in embedded mode is avoided.

Figure 5:
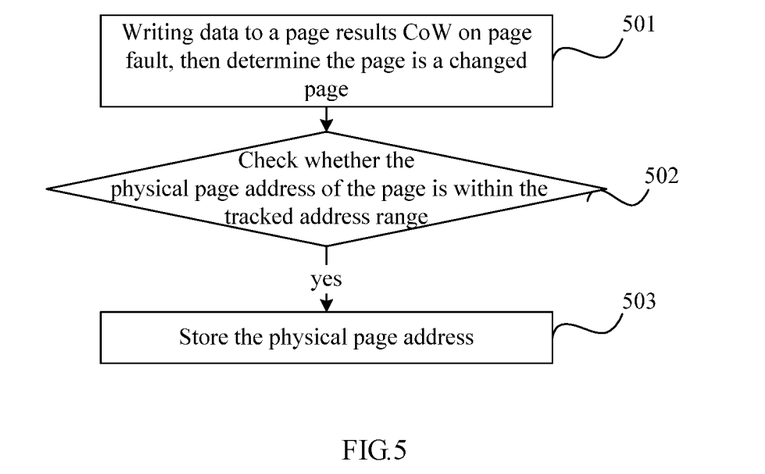
FIG. 5 is a flow chart of the process of tracking the changed page in a method of maintaining data for online analytical processing in a database system according to an embodiment of the present invention.

FIG. 5 shows a flow chart of the process of tracking the changed page in a method of maintaining data for online analytical processing in a database system according to an embodiment of the present invention. As shown in FIG. 5, the process of tracking the changed page includes:

Step 501, writing data to a page results in copy-on-write (CoW) on page fault, then determine the page is a changed page.

Step 502, check whether the physical page address of this page is within the tracked address range, if yes, perform step 503. The address range to be tracked can be stored in the process address space.

Step 503, store the physical page address. In the same way, all the CoW page addresses are stored. The physical page address can be stored in some data structure, for example in the main process data structure.

Since only the physical page addresses of the changed pages are stored, the child processes are synchronized only with the changed pages. Therefore, the PET copy is optimized to the small delta that could have changed and the synchronization is faster.

Figure 6:
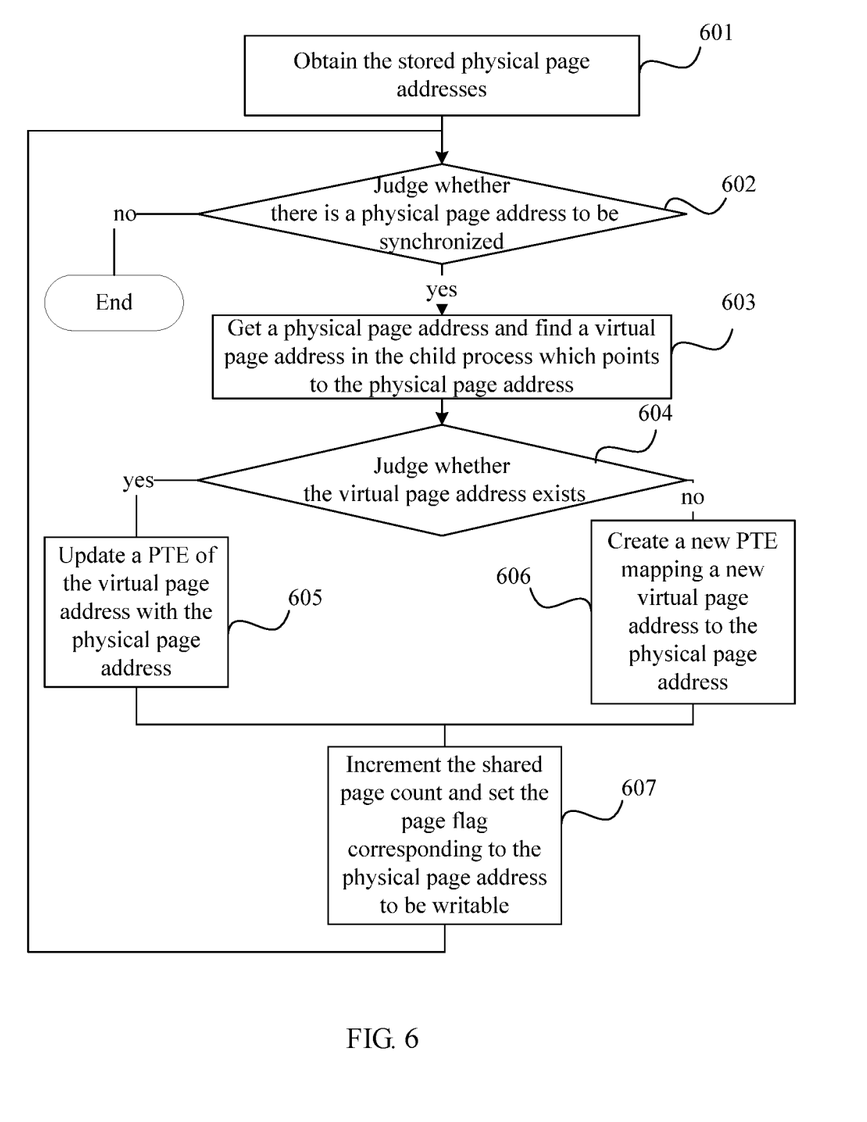
FIG. 6 is a flow chart of the process of synchronizing the changed pages to the child process in a method of maintaining data for online analytical processing in a database system according to an embodiment of the present invention.

Upon receiving the signal from the main process to synchronize, the child process should inform the OS to synchronization. FIG. 6 shows a flow chart of the process of synchronizing the changed pages to the child process in a method of maintaining data for online analytical processing in a database system according to an embodiment of the present invention, which includes:

Step 601, obtain the stored physical page address(es);

The OS gets the list of physical page addresses of the changed pages. In an embodiment, when the physical page address of the changed page is stored in the main process structure, the OS gets the main process structure and get the list of physical page addresses of the changed pages.

Step 602, =if there is a physical page address to be synchronized, perform step 603, otherwise, end the process;

Step 603, get a physical page address and find a virtual page address in the child process which points to the physical page address;

The virtual page address in the child process which points to the stored physical page address can be found by using OS specific methods, for example through invoking the function find_vma.

Step 604, if the virtual page address exists, perform step 605, otherwise, perform step 606;

Step 605, update a PTE of the virtual page address with the physical page address; perform step 607.

The OS stores its mappings of virtual addresses to physical addresses in the page table. Each mapping is also known as a page table entry (PTE). Each PTE includes the virtual address and its corresponding physical address.

Step 606, create a new PTE mapping a new virtual page address to the physical page address;

Step 607, increment the shared page count and set the page flag corresponding to the physical page address to be writable, then go back to step 602. The page is set to MAYWRITE on both main process and child process, so as to trigger CoW. The shared page count is a counter maintained by the OS to track the number of processes sharing this page. If the shared page count is more than 1, then data change in this page will trigger a CoW.

In the embodiment, only relevant PTEs, i.e. the delta changes, are synchronized. Take a sample case of synchronization with 1% data change, 99% PTE copy are reduced. Therefore the synchronization is much faster than periodic forking.

The synchronization can be implemented in the following two different modes.

Synchronous Mode

When a sync time point is reached, the operations on the main process are blocked until all the child processes are synchronized. The main process sends signal to all the child processes and waits for them to finish the synchronization. The changed pages in the main process are set to MAYWRITE, i.e. setting the changed page to be shared and writable, from all the child processes once the synchronization is started. The shared page count is also incremented by each child process to trigger CoW.

Asynchronous Mode

When the sync time point is reached, the main process first sets all its changed pages to MAYWRITE to trigger CoW and then informs the child processes to perform the synchronization and continue the following operations, instead of waiting until the synchronization is finished. In this mode, any new changes will be tracked and stored in a new data structure. The old data structure can be dropped after all the child processes finish the synchronization. The data structures for storing the physical page address of the changed pages can be switched on every sync time point. For example, there are two data structures, a first data structure and a second structure, for storing the physical paged address of the changed page. At the beginning, the physical page addresses are stored in the first data structure. When a sync time point reaches, the main process informs the child processes to synchronize according to the physical page addresses stored in the first data structure, and the page addresses of the new changed pages are stored in the second data structure. And then, when a next sync time point reaches, the two data structures are switched, i.e. synchronizing the child processes according to the second data structure and the physical page address of the new changed pages are stored in the first data structure.

Figure 7:
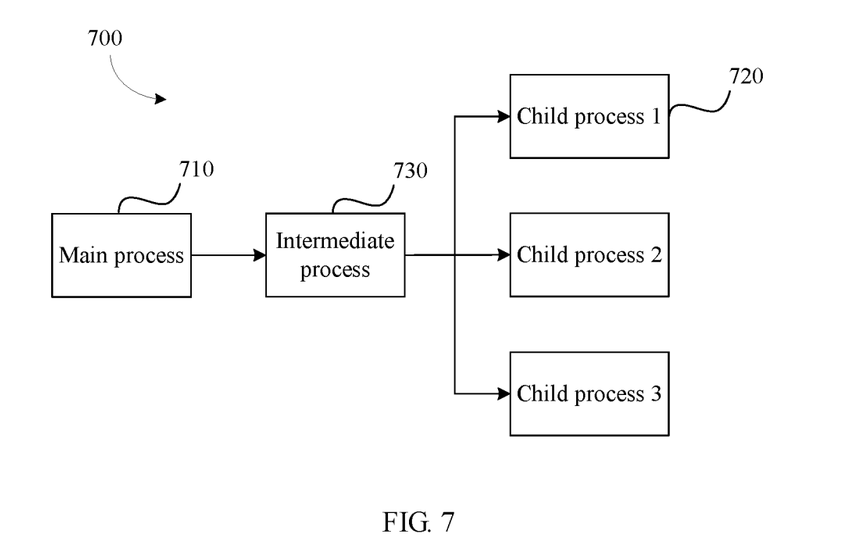
FIG. 7 is a schematic view of a database system topology according to an embodiment of the present invention.

FIG. 7 shows a schematic view of a database system topology according to another embodiment of the present invention. Compared with the topology shown in FIG. 1, this database system 700 has an intermediated process 730 between the main process 710 for OLTP and the child processes 720 for OLAP. The intermediate process 730 is responsible for forking the required number of child processes 720 and synchronizing the child processes 720. The main process 710 directly synchronizes only the intermediate process 730 with the changed pages and delegates the other children synchronization to this intermediate process 730. And then the other child processes 720 synchronize with the intermediated process 730. This embodiment reduces the load on the main process. This is useful in cases where there are many child processes or the child processes are slow to synchronize.

Figure 8:
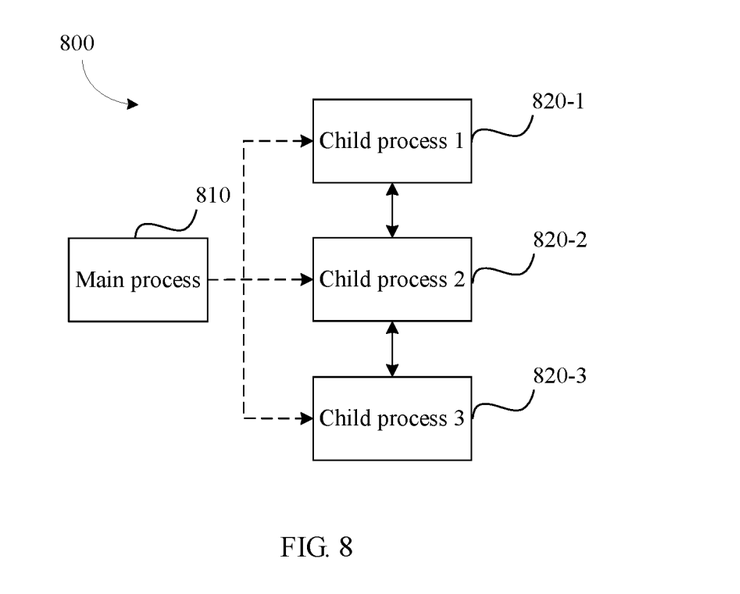
FIG. 8 is a schematic view of a database system topology according to another embodiment of the present invention.

FIG. 8 shows a schematic view of a database system topology according to another embodiment of the present invention. In this database system 800, there could be peer-peer synchronization between the child processes 820-1, 820-2 and 820-3. The main process 810 will synchronize anyone of the child processes depending on which one is free or has the least workload. Then the other child processes are synchronized using the peer synchronized child processes, i.e. being synchronized with the child process that has been synchronized directly from the main process. For example, when a sync time point reaches, the main process 810 determines that the child process 820-1 is free or has the least workload among the child processes 820-1, 820-2 and 820-3, then the main process 810 informs the child process 820-1 to synchronize with the main process 810, and informs the child processes 820-2 and 820-3 to synchronize with the child process 820-1. This embodiment makes the synchronization between the main process and the child processes faster.

Figure 9:
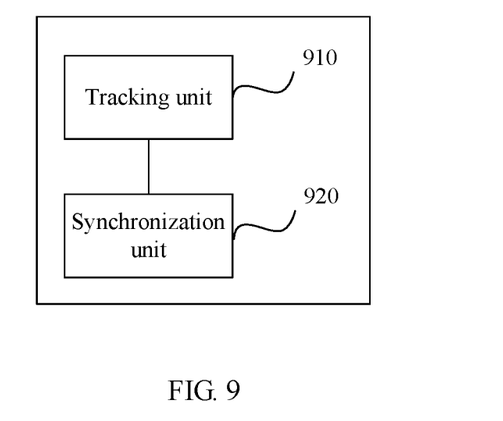
FIG. 9 is a schematic block diagram of an apparatus of maintaining data for online analytical processing in a database system according to an embodiment of the present invention.

FIG. 9 shows a schematic block diagram of an apparatus of maintaining data for online analytical processing in a database system according to an embodiment of the present invention. The apparatus includes a tracking unit 910 and a synchronization unit 920. The tracking unit 910 is configured to track a page changed by a main process which runs in the database system and executes online transaction processing. The synchronization unit 920 is configured to synchronize the changed page to a child process which runs in the database system and executes online analytical processing.

In the embodiment of the apparatus for online analytical processing in a database system, the changed pages are tracked, and then the child process for online analytical processing is synchronized with the changed pages. Compared with the solution of periodically forking child processes to maintain consistent snapshots of the transactional data, this embodiment synchronizes the changed pages to the existing child process, thus periodic forking is avoided, fork overhead due to periodical forking is removed, the synchronization is faster since only the changed pages are synchronized, and the performance of online data processing is enhanced.

Figure 10:
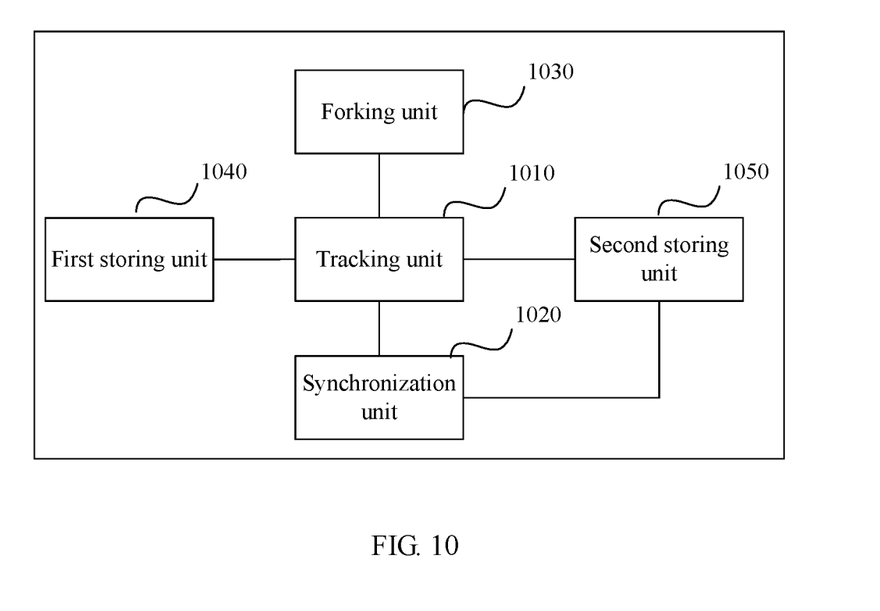
FIG. 10 is a schematic block diagram of an apparatus of maintaining data for online analytical processing in a database system according to an embodiment of the present invention.

FIG. 10 shows a schematic block diagram of an apparatus of maintaining data for online analytical processing in a database system according to an embodiment of the present invention. Compared with the apparatus of online analytical processing shown in FIG. 9, the apparatus of FIG. 18 further includes a forking unit 1030, a first storing unit 1040, and a second storing unit 1050. The forking unit 1030 is configured to fork the child processes for the online analytical processing. When a memory required by a database system is allocated, the forking unit 1030 forks the child processes at once. The first storing unit 1040 is configured to store an address range of a memory to be tracked. The second storing unit 1050 is configured to store a physical page address of the changed page.

The tracking unit 1010 tracks a copy-on-write page and/or a new page. When writing data to the page results in a page fault, the tracking unit 1010 checks whether the physical page address of the page is within the address range stored in the first storing unit 1040. If the physical page address is within the address range, the tracking unit 1010 stores the physical page address of the changed page into the second storing unit 1050. Since only the physical page addresses of the changed pages are stored, the child processes are synchronized only with the changed pages. Therefore, the PET copy is optimized to the small delta that could have changed and the synchronization is faster.

The synchronization unit 1020 obtains the physical page address from the second storing unit 1050 and finds in the child processes a virtual page address which points to the obtained physical page address. If the virtual page address exists, the synchronization unit 1020 updates a PTE of the virtual page address with the physical page address obtained from the second storing unit 1050. If the virtual page address does not exist, the synchronization unit 1020 creates a new PTE mapping a new virtual page address in the child process to the physical page address. Then the synchronization unit 1020 increments a shared page count and sets a page flag corresponding to the obtained page address to be writable, i.e. MAYWRITE.

In an embodiment, the time point for synchronization, i.e. the sync time point is pre-determined, and the synchronization unit 1020 synchronizes the changed page to the child processes on the pre-determined sync time point.

In an embodiment, the forking unit 1030 is specifically configured to fork an intermediate process and the child processes for the online analytical processing, where the child processes for the online analytical processing are children of the intermediate child process. The synchronization unit 1020 is specifically configured to synchronize the changed page to the intermediate process first and then synchronize the child processes for the online analytical processing with the intermediate process.

In an embodiment, there could be peer-peer synchronization between the child processes. The synchronization unit 1020 is specifically configured to synchronize the changed page to one of the child process and then synchronize the other child processes with the child process that has be synchronized directly from the main process. The child process directly synchronized with the changed page could be determined depending on which one is free or has the least workload.

In the embodiment of the apparatus for online analytical processing in a database system, the child processes for online analytical processing are forked, the changed pages are tracked, and then the forked child processes are synchronized with the changed pages. Compared with the solution of periodically forking child processes to maintain consistent snapshots of the transactional data, the embodiment synchronizes the changed pages to the existing child process, thus periodic forking is avoided, fork overhead due to periodic forking is removed, the synchronization is faster since only the changed pages are synchronized, and the performance of online data processing is enhanced.

In addition, compared to the periodic forking solution in prior art, in the embodiments of the present invention, many other data copy and process setup are also reduced. The child process has loaded cache entries and TLB entries which remain intact if the relevant page was not changed. So the data remains hot and cache misses are reduced, and thus the child process performance is also better.

In the periodic forking solution in the prior art, at some point of time, there could be many child processes in the system thus consuming memory and CPU. However, in the embodiments of the present invention, the number of child processes are fixed and controlled. So there is no problem of too much system resource consumption.

Moreover, many main memory databases are used in embedded mode i.e. the query execution from the application is done through an API call on the database. In embedded mode, the periodic forking solution in the prior art will lead to loss of the application link. By contrast, in the embodiments of the present invention, the application link in embedded mode are retained, since the child processes are created initially and kept alive instead of periodically killing old child processes and forking new child processes, therefore the loss of the application link in embedded mode is avoided.

Figure 11:
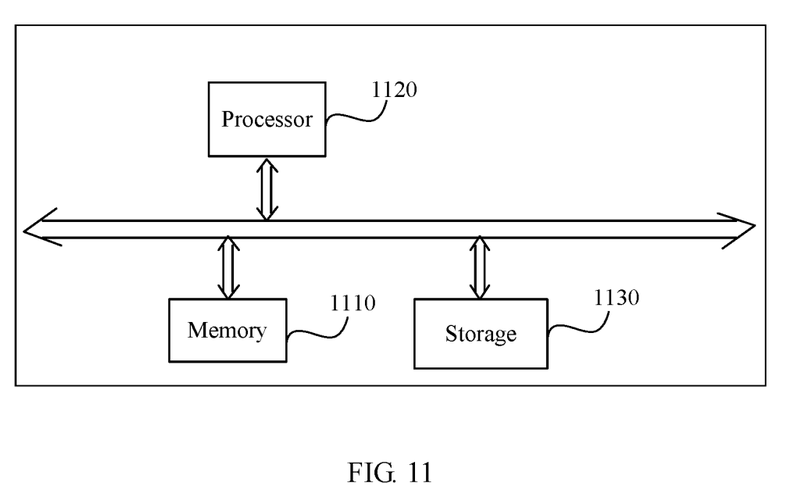
FIG. 11 is a schematic block diagram of an apparatus of maintaining data for online analytical processing in a database system according to an embodiment of the present invention.

FIG. 11 shows a schematic block diagram of an apparatus of maintaining data for online analytical processing according to an embodiment of the present invention. The apparatus of maintaining data for online analytical processing in a database system includes a memory 1110 for storing a database; a processor 1120; and a storage 1130, couple to the processor 1120, storing instructions that, when executed by the processor 1120, cause the processor 1120 to perform the method of maintaining data for online analytical processing in a database system according to the embodiments of the present invention.

The memory 1110 can include high speed RAM, and also can include non-volatile memory.

The processor 1120 can be a central processing unit (CPU), or application specific integrated circuit (ASIC), or one or more integrated circuits configured to implement embodiments of the present invention.

Alternatively, in specific implementation, if the memory 1110, the processor 1120, and the storage 1130 are implemented individually, then the memory 1110, the processor 1120 and the storage 1130 can communicate via a bus. The bus can be industry standard architecture (ISA) bus, peripheral component interconnect (PCI) bus or extended industry standard architecture (EISA) bus etc. The bus can be divided into address bus, data bus and control bus etc. For convenient representation, the bus is only represented by a single thick line, but does not mean there is only one bus or one kind of bus.

Alternatively, in specific implementation, if the memory 1110, the processor 1120 and the storage 1130 are integrated in a single chip, then the memory 1110, the processor 1120 and the storage 1130 can communicate via internal interface.

It should be appreciated by persons skilled in the art that, all or a part of the steps in the method of the above embodiments may be completed by relevant hardware under the instruction of a program, and the program may be stored in a computer readable storage medium, when the program is executed, the steps of the above method embodiments are performed. The storage medium may be, such as a read only memory (ROM)/random access memory (RAM), a floppy disk, or an optical disk.

It should be noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the scope of the present invention.

The invention claimed is:

1. A method performed by a computer processor executing computer instructions stored in a memory for maintaining data for online analytical processing in a database system, comprising:
    tracking, by an operating system kernel, pages in the memory within an address range to detect a page changed by a main process which runs in the database system and executes online transaction processing; and
    synchronizing, by the operating system kernel, the changed page to a child process which runs in the database system and executes online analytical processing; wherein at least one page table entry (PTE) is updated or created in a page table of the child process according to a physical address of the changed page, and wherein the page table stores mappings of virtual addresses to corresponding physical addresses;
    wherein synchronizing the changed page to the child processes comprises:
        querying for, in the child process, a virtual page address which points to the physical address of the changed page, updating a PTE of the virtual page address with the physical address of the changed page when the virtual page address exists, or creating a new PTE mapping a new virtual page address to the physical address of the changed page when the virtual page address does not exists;
        incrementing a shared page count and setting a page flag corresponding to the physical address of the changed page to be writable.

2. The method according to claim 1, wherein the changed page is a copy-on-write page.

3. The method according to claim 1, further comprising: storing an address range of a memory to be tracked; wherein writing data to the changed page results in a page fault, and tracking the changed page comprises: when the physical address of the changed page is within the address range, storing the physical address in a first data structure.

4. The method according to claim 3, wherein the method further comprises: setting the changed page to be writable when a sync time point reaches; tracking a new changed page and storing a physical address of the new changed page in a second data structure.

5. The method according to claim 1, wherein synchronizing the changed page to the child process comprises synchronizing the changed page to the child process at a predetermined sync time point.

6. The method according to claim 1, further comprises: forking the child process which is a child to the main process.

7. The method according to claim 1, wherein the method further comprises: forking an intermediate process which is a child to the main process; and forking the child process which is a child to the intermediate process;
wherein synchronizing the changed page to the child process comprises:
synchronizing the changed page to the intermediate process; and
synchronizing the child process with the intermediate process.

8. The method according to claim 1, wherein the method further comprises:
synchronizing another child process with the child process to which the changed page has been synchronized.

9. The method according to claim 1, wherein the method further comprises: when a sync time point reaches, blocking the online transaction processing until the child process is synchronized; and setting the changed page to be shared and writable from the child process.

10. A database system of maintaining data for online analytical processing (OLAP), comprising:
a processor, and
a memory storing computer instructions executable by the processor, wherein the processor is configured to execute the operation instruction and cause the database system to:
track pages in the memory within an address range to detect a page changed by a main process that runs in the database system and executes online transaction processing; and
synchronize the changed page to at least one child process which runs in the database system and executes online analytical processing; wherein at least one page table entry (PTE) is updated or created in a page table of the child process according to a physical address of the changed page, and wherein the page table stores mappings of virtual addresses to corresponding physical addresses;
wherein synchronizing the changed page to the child processes comprises:
querying for, in the child process, a virtual page address which points to the physical address of the changed page, updating a PTE of the virtual page address with the physical address of the changed page when the virtual page address exists, or creating a new PTE mapping a new virtual page address to the physical address of the changed page when the virtual page address does not exists;
incrementing a shared page count and setting a page flag corresponding to the physical address of the changed page to be writable.

11. The database system according to claim 10, wherein the changed page is a copy-on-write page.

12. The database system according to claim 10, wherein writing data to the changed page results in a page fault, and the processor is further configured to:
store an address range of a memory to be tracked;
store the physical address of the changed page in the memory when the physical address of the changed page is within the address range.

13. The database system according to claim 10, wherein the processor is further configured to fork, when a memory required by the database system is allocated, the child process for the online analytical processing.

14. The database system according to claim 10, wherein the processor is further configured to synchronize the changed page to the child process at a predetermined sync time point.

15. The database system according to claim 10, wherein the processor is further configured to:
fork an intermediate process and the child process, wherein the intermediate process is a child to the main process and the child process is a child to the intermediate process; and
synchronize the changed page to the intermediate process; and synchronize the child process with the intermediate process.

16. The database system according to claim 10, wherein the processor is further configured to synchronize another child process with the child process to which the changed page has been synchronized.

17. A non-transitory computer readable medium containing computer instructions that, when executed by a processor, cause the processor to perform the steps of:
tracking pages in the memory within an address range to detect a page changed by a main process which runs in the database system and executes online transaction processing; and
synchronizing the changed page to a child process which runs in the database system and executes online analytical processing; wherein at least one page table entry (PTE) is updated or created in a page table of the child process according to a physical address of the changed page, and wherein the page table stores mappings of virtual addresses to corresponding physical addresses;
wherein synchronizing the changed page to the child processes comprises:
querying for, in the child process, a virtual page address which points to the physical address of the changed page, updating a PTE of the virtual page address with the physical address of the changed page when the virtual page address exists, or creating a new PTE mapping a new virtual page address to the physical address of the changed page when the virtual page address does not exists;
incrementing a shared page count and setting a page flag corresponding to the physical address of the changed page to be writable.

18. The non-transitory computer readable medium according to claim 17, wherein the changed page is a copy-on-write page.

19. The non-transitory computer readable medium according to claim 17, further comprising computer instructions that, when executed by the processor, cause the processor to perform the steps of:
storing an address range of a memory to be tracked; and
tracking the changed page comprises: when the physical address of the changed page is within the address range, storing the physical address in a first data structure.

20. The non-transitory computer readable medium according to claim 17 further comprises computer instructions that, when executed by the processor, cause the processor to perform the steps of: setting the changed page to be writable when a sync time point reaches; tracking a new changed page and storing a physical address of the new changed page in a second data structure.

21. The non-transitory computer readable medium according to claim 17, wherein synchronizing the changed page to the child process comprises synchronizing the changed page to the child process at a predetermined sync time point.

22. The non-transitory computer readable medium according to claim 17, further comprising computer instructions that, when executed by the processor, cause the processor to fork the child process which is a child to the main process.

23. The non-transitory computer readable medium according to claim 17, further comprising computer instructions that, when executed by the processor, cause the processor to: fork an intermediate process which is a child to the main process; and fork the child process which is a child to the intermediate process; and wherein synchronizing the changed page to the child process comprises: synchronizing the changed page to the intermediate process; and synchronizing the child process with the intermediate process.

24. The non-transitory computer readable medium according to claim 17, further comprising computer instructions that, when executed by the processor, cause the processor to:

synchronize another child process with the child process to which the changed page has been synchronized.

25. The non-transitory computer readable medium according to claim 17, further comprising computer instructions that, when executed by the processor, cause the processor to perform the steps of: when a sync time point reaches, blocking the online transaction processing until the child process is synchronized; and setting the changed page to be shared and writable from the child process.

* * * * *